(No Model.) 3 Sheets—Sheet 1.

E. NEUMEISTER & R. SOBOTKA.
MACHINE FOR BORDERING AND FLANGING PIPES.

No. 596,177. Patented Dec. 28, 1897.

Witnesses:
E. B. Bolton
O. D. Munn

Inventors:
Eduard Neumeister
Richard Sobotka
By [signature]
their Attorneys (No Model.) 3 Sheets—Sheet 2.

E. NEUMEISTER & R. SOBOTKA.
MACHINE FOR BORDERING AND FLANGING PIPES.

No. 596,177. Patented Dec. 28, 1897.

Witnesses:
E. B. Bolton
Otto Umm

Inventors:
Eduard Neumeister
Richard Sobotka
By Neuweiler R
their Attorneys (No Model.) 3 Sheets—Sheet 3.
E. NEUMEISTER & R. SOBOTKA.
MACHINE FOR BORDERING AND FLANGING PIPES.
No. 596,177. Patented Dec. 28, 1897.
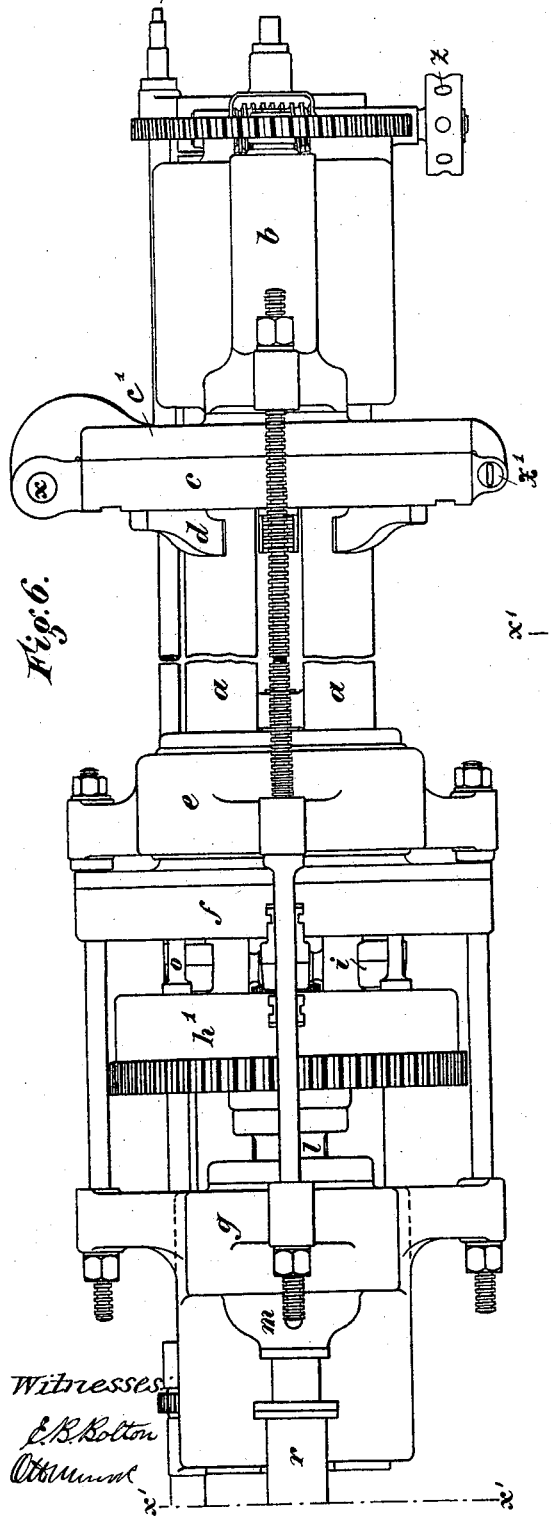
Fig. 6.
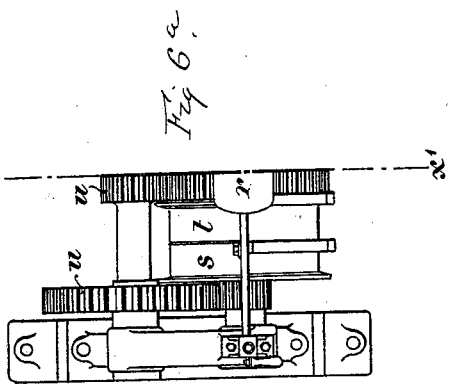
Fig. 6ª.
Witnesses:
E. B. Bolton
Ott[...]
Inventors:
Eduard Neumeister
Richard Sobotka
By [signature]
their Attorneys

UNITED STATES PATENT OFFICE.

EDUARD NEUMEISTER, OF BERLIN, AND RICHARD SOBOTKA, OF MAGDEBURG, GERMANY, ASSIGNORS TO EDUARD BENDEL, OF MAGDEBURG, GERMANY.

MACHINE FOR BORDERING AND FLANGING PIPES.

SPECIFICATION forming part of Letters Patent No. 596,177, dated December 28, 1897.

Application filed July 19, 1897. Serial No. 645,114. (No model.) Patented in Germany May 7, 1895, No. 90,257, and in England February 25, 1896, No. 4,256.

*To all whom it may concern:*

Be it known that we, EDUARD NEUMEISTER, a citizen of Prussia, residing at Berlin, Prussia, and RICHARD SOBOTKA, a citizen of Saxony, residing at Magdeburg, Saxony, Germany, have invented certain new and useful Improvements in Machines for Flanging Pipes; and we do hereby declare the following to be a full, clear, and exact description of the invention, such as will enable others skilled in the art to which it appertains to make and use the same.

The invention has been patented in Germany, No. 90,257, dated May 7, 1895, and in Great Britain, No. 4,256, dated February 25, 1896.

This invention relates to a machine provided for jumping, bordering, and flanging pipes, and is represented by the annexed three sheets of drawings, in which—

Figure 1:
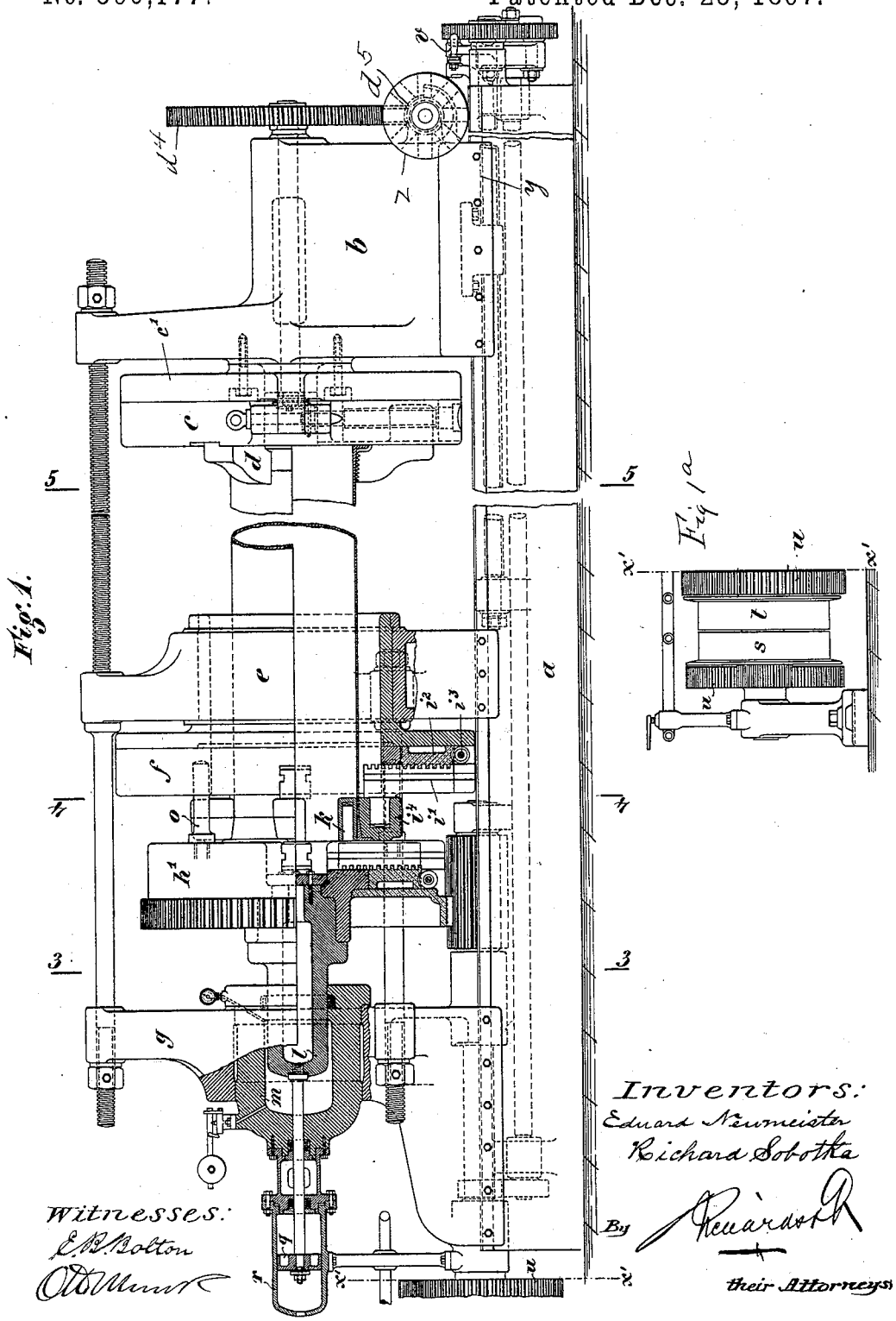
Figure 2:
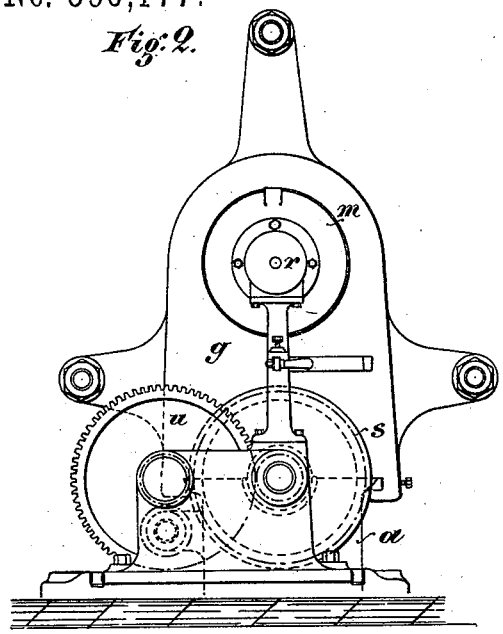
Figure 3:
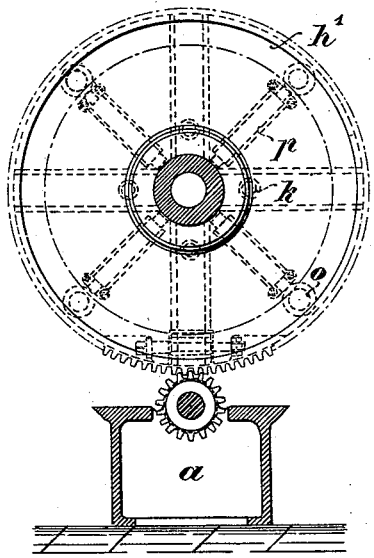
Figure 4:
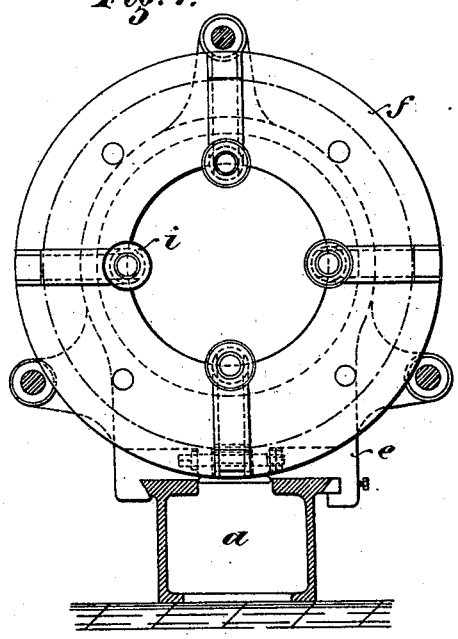
Figure 5:
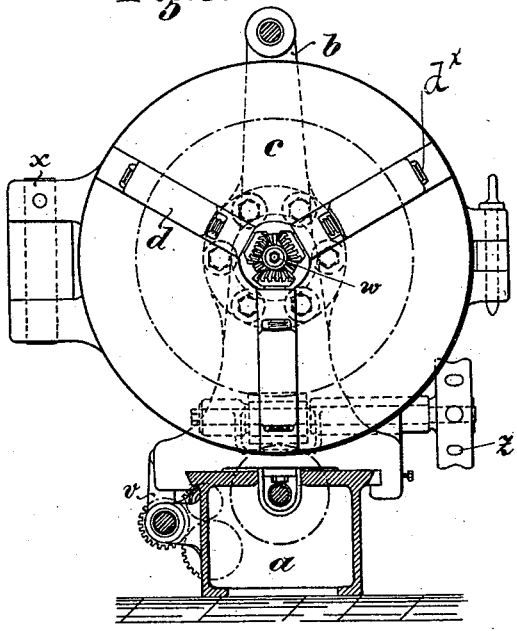

Figure 1 is a side view of the machine, partly in section. Fig. 1ª is a detail of a continuation of Fig. 1 at the left thereof beyond the line X' X'. Fig. 2 is an end view; Fig. 3, a transverse section on line 3 3 of Fig. 1; Fig. 4, a similar section on line 4 4 of Fig. 1, and Fig. 5 a transverse section on line 5 5 of Fig. 1. Fig. 6 is a plan view of the machine. Fig. 6ª is a detail showing a continuation of Fig. 6, lying beyond the line X' X', Fig. 6.

The machine consists of a frame $a$, upon which the support $b$ is movably secured. This support $b$ is provided with a clutch surface-plate $c$ and serves to clamp the ends of the pipes to be bordered or flanged. The clutch-plate $c$ is not directly attached to the support $b$, but to a plane disk $c'$, firmly fixed to the said support, while plate $c$ is pivotally connected with the by-plate $c'$ by a vertical hinge-joint $x$, Fig. 6, allowing a turning of plate $c$ to a position at right angles with relation to the horizontal axes of the disks. For this purpose the pin $x'$ is lifted. This pin connects the two disks $c\ c'$ by corresponding eyes. The surface-plate $c$ is provided with three radially-movable clutches $d$, which can be approached to the center of the disk in known manner, as the sliding clutches $d$ are connected with and operated from screw-spindles $d^\times$, ending near the middle of the disk and having beveled gears gearing all together with a conical wheel fixed on the shaft $w$. This shaft is provided with a screw-wheel $d^4$ and gears with a worm $d^5$, whose shaft can be operated by turning the hand-wheel $z$. To the support $b$ is given a sliding movement in the direction of the bed $a$ by a leading-screw $y$. Another support $e$ is also movably put upon the frame $a$, which, with its annular head, incloses a collar $f$, loosely fitting into it. This collar $f$ is a part of the disk into the face of which are radially put in corresponding slits the sliding pieces $i'$. A screw $i^3$, gearing with a toothed wheel $i^2$, whose side face gears with the sliding pieces $i'$, allows a contemporary approaching of the pieces $i'$ to the middle of $f$. The pieces $i'$ are provided with pins supporting the cylinders $i^4$, the cross-section of which corresponds to the intended form of the flange.

The support $g$ is in its middle formed as a hydraulic-pressure cylinder having a piston $l$, whose top is enlarged to a plane disk $h'$, upon which the cylinders $k$ are movably fixed in the same manner as is the case with the disk $f$ and the cylinders $i^4$, respectively. The cylinders correspond with their cross-section to the inside of the pipe to be flanged. The circumference of $h'$ is provided with teeth and gears with a pinion actuated by the loose and fixed pulleys $s\ t$.

The working of the machine is as follows: The one end of the pipe is red-heated in a convenient furnace and the surface-plate $c$ turned aside for receiving the cold end of the pipe. Hereupon the disk is turned in the position of the drawings and the clutches pressed against the circumference of the pipe by the above-mentioned arrangement. For bringing in the pipe the support $b$ must be unscrewed by the leading-screw $y$ in due measure for bringing the hot end of the pipe between the rollers. The support $b$ is now made to advance corresponding to the length of the pipe. Hereupon the hydraulic-pressure cylinder $g$ is engaged, and in the same time the gear is made to turn by the pulley $t$, in consequence of which the piston $l$ will make in the same time a progressive and, by the effect of the gear, a turning movement, so that the rollers $k$ will be introduced into the pipe and will rotate in its inside. The disk $h'$ is provided with pins $o$, locking into corresponding holes of disk $f$, so that the latter will also be turned. In this way the right form is given the flange. When the work is done, the pressure-water is by a reversible valve conducted behind the by-piston $g$ and the piston $l$ will be withdrawn.

What we claim as new, and desire to secure by Letters Patent of the United States, is—

A machine for flanging pipe ends having rollers arranged around the middle of a rotary disk, the axes of which run parallel to that of said disk and are fixed to supports movably arranged in radial slits of the disk, which rollers have a cross-section corresponding to the surface of the flange, &c., to be formed, said machine having a second rotary ring provided with rollers corresponding to the inside of the pipe to be flanged, this ring being the top plate of a hydraulic press, substantially as set forth.

In testimony whereof we affix our signatures in presence of two witnesses.

EDUARD NEUMEISTER.
RICHARD SOBOTKA.

Witnesses:
FR. MEFFERT,
W. HAMBURGER.